United States Patent [19]

Katayama

[11] Patent Number: 4,693,064
[45] Date of Patent: Sep. 15, 1987

[54] GRASS COLLECTION BAG FOR LAWN MOWER

[75] Inventor: Takao Katayama, Sennan, Japan

[73] Assignee: Kubota, Ltd., Osaka, Japan

[21] Appl. No.: 938,694

[22] Filed: Dec. 5, 1986

[30] Foreign Application Priority Data

May 2, 1986 [JP] Japan .................................. 61-102717

[51] Int. Cl.$^4$ .......................................... A01D 34/70
[52] U.S. Cl. ...................................................... 56/202
[58] Field of Search ...................... 56/202, 16.6; 150/1

[56] References Cited

U.S. PATENT DOCUMENTS

| 3,928,956 | 12/1975 | Boxer | 56/202 |
| 4,258,538 | 3/1981 | Morse | 56/202 |
| 4,345,418 | 8/1982 | Arizpe | 56/202 |
| 4,413,467 | 11/1983 | Arizpe | 56/202 |
| 4,444,002 | 4/1984 | Heismann et al. | 56/202 |
| 4,522,019 | 6/1985 | Edwards et al. | 56/202 |
| 4,566,257 | 1/1986 | Akrabawi | 56/202 |

Primary Examiner—Paul J. Hirsch
Attorney, Agent, or Firm—Jordan and Hamburg

[57] ABSTRACT

A grass collection bag suited for use with a walking operator type lawn mower having a cutting blade and a steering handle extending rearwardly, which grass collection bag is removably attached to the steering handle to extend in a fore-and-aft direction of the lawn mower. The grass collection bag comprises a tubular main body portion defining a grass inlet at a forward end thereof and a grass outlet at a rear end thereof, and a lid member attached to the main body portion to be vertically swingable about an axis adjacent a lower rear edge of the main body portion for opening and closing the grass outlet. The main body portion includes a first engagement member extending along an upper rear edge thereof, and the lid member includes a second engagement member extending along a free end edge thereof. One of the first and second engagement members defines a slit which is vertically directed when in an engaged position, and the other defines a projection engageable with the slit.

5 Claims, 4 Drawing Figures

GRASS COLLECTION BAG FOR LAWN MOWER

BACKGROUND OF THE INVENTION

The present invention relates to a grass collection bag for use with a walking operator type lawn mower having a cutting blade and a steering handle extending rearwardly. The bag is removably attached to the steering handle to extend in a fore-and-aft direction of the lawn mower. More particularly, the invention relates to an engagement structure provided on the grass collection bag for engaging a lid member.

A conventional grass collection bag of this type is disclosed, for example, in U.S. Pat. No. 4,258,538. The grass collection bag disclosed therein comprises a substantially tubular main body portion defining a grass inlet at a forward end thereof and a grass outlet at a rear end thereof, and a lid member attached to the main body portion to be vertically swingable about an axis adjacent a lower rear edge of the main body portion for opening and closing the grass outlet. Rib members defining handles are attached to an upper rear edge of the main body portion and a free end edge of the lid member, respectively. The grass collection bag is attached at the rear end thereof to a steering handle by placing the rib member of the lid member in engagement with a support rod connected to the steering handle and placing hooks provided on the rib member of the main body portion in engagement with the support rod.

According to this known grass collection bag, the lid member positively closes the grass outlet when the grass collection bag is attached to the mower and never opens it inadvertently during a grass cutting operation. However, after the grass collection bag filled with grass clippings is removed from the mower for disposal of the grass clippings, the operator must carry the bag to a location of disposal by firmly gripping the handles of the two rib members since no means is provided for maintaining a mutual engagement of the two rib members. In other words, when carrying the grass collection bag filled with grass clippings and removed from the mower to the location of disposal of the grass clippings, the operator must grip the handles of the two rib members with one hand and grip the forward end of the bag with the other hand, with the forward end raised higher than the rear end of the bag. It is troublesome to have to carry the bag full of grass clippings in such a posture.

SUMMARY OF THE INVENTION

The present invention intends to improve the conventional grass collection bag noted above. The object of the invention, therefore, is to provide a grass collection bag including a lid member that positively remains in a closed position when the grass collection bag is attached in the lawn mower, which grass collection bag is easy to carry after removal from the mower without the special trouble of preventing the lid member from opening during the transport, the lid member being relatively easily openable for discharge of grass clippings from the bag.

In order to achieve this object, the grass collection bag according to the present invention comprises a substantially tubular main body portion defining a grass inlet at a forward end thereof and a grass outlet at a rear end thereof, a lid member for opening and closing the grass outlet, the lid member being attached to the main body portion to be vertically swingable about an axis adjacent a lower rear edge of the main body portion, and engaging means including a first engagement member attached to the main body portion adjacent an upper rear edge thereof and a second engagement member attached to the lid member adjacent a free end edge thereof, one of the first and second engagement members defining a slit vertically directed when in an engaged position, and the other of the first and second engagement members defining a projection engageable with the slit, whereby the first and second engagement members are releasably engageable with each other.

With this type of grass collection bag, grass clippings carried by drafts enter the bag through the grass inlet at the forward end thereof during a grass cutting operation, and the lid member at the rear end of the bag is caused by the drafts to bulge rearwardly. In this state, according to the present invention, the free end edge of the lid member and the upper rear end of the main body portion engage each other through the two engagement members defining the slit vertically directed when in the engaged position and the projection engageable with the slit, respectively. The engagement through the two engagement members remains very firm during the grass cutting operation. To be more particular, the rearward bulging of the lid member causes the engagement member adjacent the free end edge of the lid member to turn slightly in a direction of engagement between the slit and the projection, and this renders the engagement between the two engagement members extremely firm so that the lid member never opens inadvertently during the grass cutting operation.

Once the grass collection bag is removed from the mower, the rearward bulging of the lid member recedes to a more planar state. Therefore, the engagement between the two engagement members may easily be released by lifting the engagement member provided on the lid member for disposing of the grass clippings.

After the bag is removed from the mower, the lid member is retained in the closed position by the two engagement members though their engagement is not so firm as at times of the grass cutting operation with the bag attached to the mower. Therefore, the bag is carried by the operator with ease since he does not have to take the trouble of holding the lid in the closed position with his hand.

Other objects and advantages of the present invention will be apparent from the following description.

BRIEF DESCRIPTION OF THE DRAWINGS

The drawings illustrate a grass collecting bag embodying the present invention, in which.

DESCRIPTION OF THE PREFERRED EMBODIMENT

Figure 1:
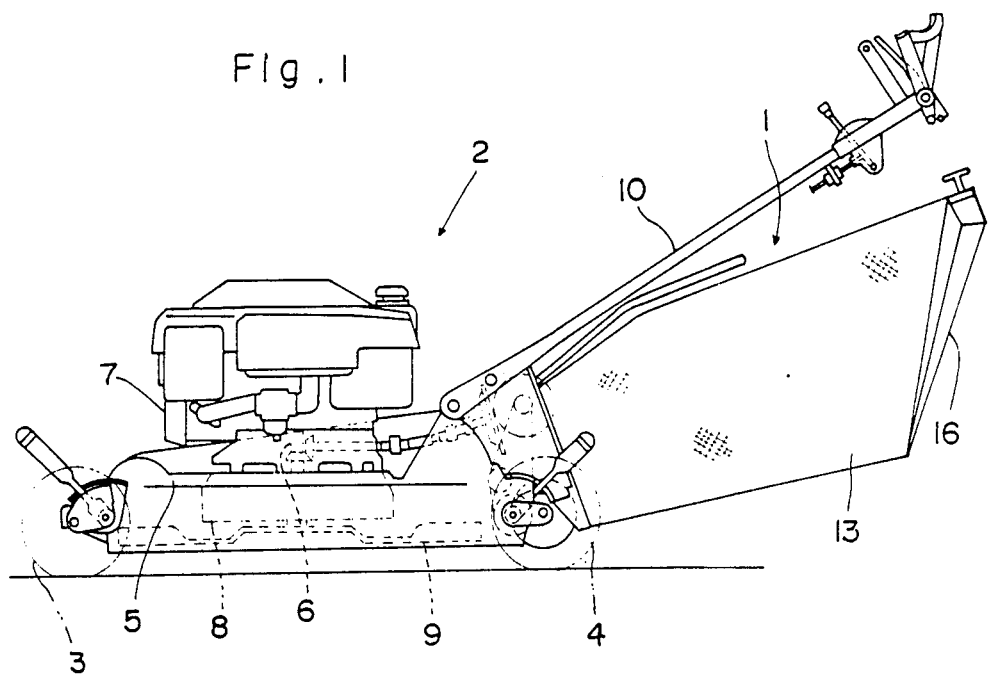
FIG. 1 is a side view of the grass collection bag as mounted on a walking operator type lawn mower.

An embodiment of the invention will be described hereinafter with reference to the drawings. FIG. 1 shows a grass collection bag 1 mounted on a walking operator type lawn mower 2. The lawn mower comprises a pair of right and left free rotation wheels 3 and a pair of right and left drive wheels 4 supporting a chassis 5. The chassis 5 carries an engine 7 having an output shaft 6 extending downwardly. The output shaft 6 is operatively connected to a grass cutting blade 9 disposed therebelow through a clutch 8 and to the drive wheels 4 through a suitable transmission mechanism. A steering handle 10 is attached to and extends rearwardly from the chassis 5. The grass collection bag 1 is attached to the steering handle 10 through an unillustrated mounting means to depend from and extend substantially along the steering handle 10.

Figure 2:
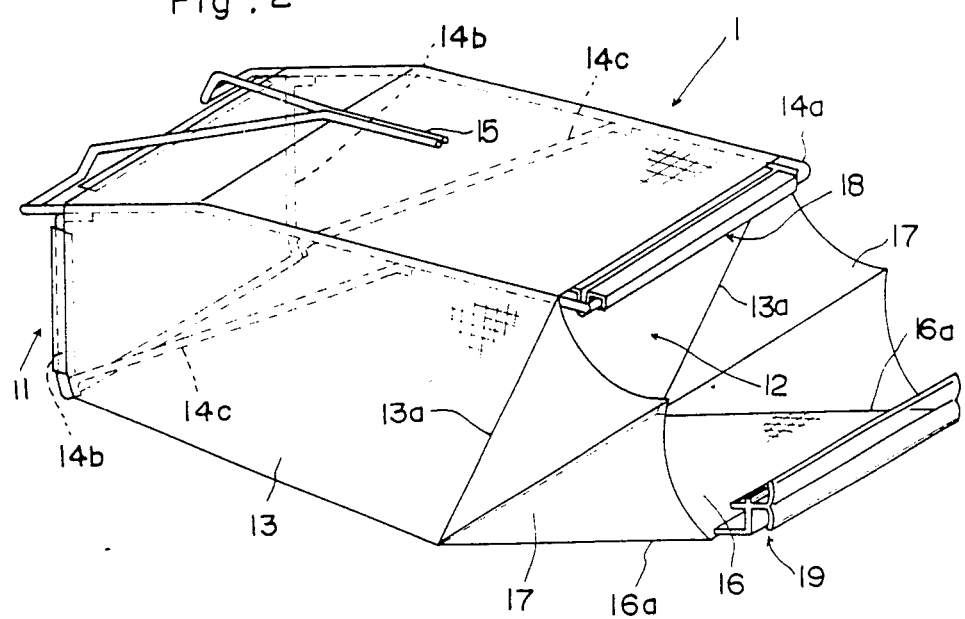
FIG. 2 is a perspective view of the grass collection bag.

Referring to FIG. 2, the grass collection bag 1 includes a tubular main body portion 13 defining a grass inlet 11 at a forward end thereof and a grass outlet 12 at a rear end thereof. The main body portion 13 is maintained in shape by a first frame 14a attached to upper edges thereof, a second frame 14b secured to the first frame 14a to extend along peripheries of the grass inlet 11, and a pair of right and left thrid frames 14c secured between the first frame 14a and second frame 14b. These frames 14a, 14b and 14c are formed of metal rods. A grip 15 also formed of metal rods is secured to the first frame 14a. At the rear end of the main body portion 13 a lid member 16 is attached to a lower edge thereof to be movable between an open position and a closed position relative to the grass outlet 12. Side wall members 17 extend between opposite side edges 16a of the lid member 16 and opposite side edges 13a of the grass outlet 12 of the main body portion 13, respectively, the side wall members 17 being inwardly foldable when the lid member 16 is in the closed position. The main body portion 13, lid member 16, and side wall members 17 are all formed of a cloth having a good gas permeability. The main body portion 13 includes a first engagement member 18 extending over the entire length of an upper rear edge thereof, and the lid member 16 includes a second engagement member 19 extending over the entire length of a free end edge thereof. The grass outlet 12 is closed by swinging the lid member 16 upwardly and placing the second engagement member 19 into engagement with the first engagement member 18.

Figure 3:
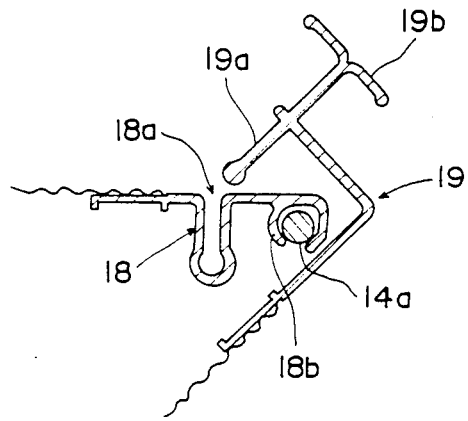
FIG. 3 is a sectional view of an engaging portion of a lid member.

The two engagement members 18 and 19 are formed of plastics and are gas impermeable over entire lengths thereof. The engagement members 18 and 19 have specific constructions as shown in FIG. 3. It will be seen that the first engagement member 18 includes a bottomed slit 18a and a substantially C-shaped hook portion 18b formed integral with each other, the slit 18 being directed substantially vertical when the grass collection bag 1 is mounted on the lawn mower 2, and the hook portion 18b being oscillatably fitted on a portion of the first frame 14a extending along the upper rear edge of the main body portion 13. The second engagement member 19 has a substantially L-shaped section and includes a projection 19a and a grip 19b formed integral with each other, the projection 19a being engageable with the slit 18a of the first engagement member 18.

Figure 4:
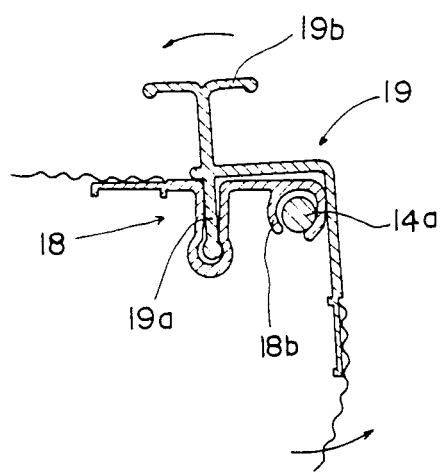
FIG. 4 is a sectional view showing a function of the engaging portion.

The foregoing embodiment functions as follows. As the engine 7 is actuated to drive the lawn mower 2 while rotating the cutting blade 9, the cutting blade 9 cuts grass and resulting grass clippings are delivered into the grass collection bag 1 as entrained on drafts generated by the rotation of the cutting blade 9. The drafts cause the lid member 16 to bulge rearwardly and, as a result, as shown in FIG. 4, the second engagement member 19 slightly turns counterclockwise placing the projection 19a into firm engagement with the slit 18a. Thus, the simple engagement structure consisting of the slit 18a and projection 19a is effective to prevent the lid member 16 from opening during a grass cutting operation. The drafts entering the grass collection bag 1 blow out together with fine particles of dust through the gas permeable main body portion 13 and lid member 16. However, the two engagement members 18 and 19 extending over the entire transverse length of the grass collection bag 1 and disposed below the operator's face prevent the fine particles of dust from being blown directly to the operator's face. Furthermore, the bottomed slit 18a and the projection 19a together define a labyrinth which is effective to stop the dust blowing out therethrough.

The bag 1 filled with the grass clippings is removed from the lawn mower 2 and is carried by the operator holding the grip 15. At this time the bag 1 may be carried with the grass inlet 11 disposed slightly upwardly to cause the lid member 16 to swell rearwardly, and this ensures the firm engagement between the two engagement members 18 and 19. For discharging the grass clippings from the bag 1, the operator may hold the grip 19b and lift the second engagement member 19 whereby the second engagement member 19 is readily disengaged from the first engagement member 18 permitting the lid member 16 to open. Instead of manually pulling the projection 19a out of the slit 18a, the bag 1 may just be dropped to the ground whereupon the cloths adjacent the grass outlet 12 collapse and crumple because the rear end of the bag 1 is not reinforced by the frames to have a rigid tubular shape. Thus, when the bag 1 is dropped to the ground, the projection 19a automatically pops up out of the slit 18a.

In the described embodiment, the first engagement member 18 defines the slit 18a and the second engagement member 19 defines the projection 19a. This arrangement may be conversed in practice only if the slit is vertically directed when engaged with the projection.

The first and second engagement members 18 and 19 may be formed of any other gas impermeable materials than plastics.

I claim:

1. A grass collection bag suited for use with a walking operator type lawn mower having a cutting blade and a steering handle extending rearwardly, which grass collection bag is removably attached to the steering handle to extend in a fore-and-aft direction of the lawn mower, said grass collection bag comprising;
   a substantially tubular main body portion defining a grass inlet at a forward end thereof and a grass outlet at a rear end thereof,
   a lid member for opening and closing said grass outlet, said lid member being attached to said main body portion to be vertically swingable about an axis adjacent a lower rear edge of said main body portion, and
   engaging means including a first engagement member attached to said main body portion adjacent an upper rear edge thereof and a second engagement member attached to said lid member adjacent a free end edge thereof, one of said first and second engagement members defining a slit vertically directed when in an engaged position, and the other of said first and second engagement members defining a projection engageable with said slit, whereby said first and second engagement members are releasably engageable with each other.

2. A grass collection bag as claimed in claim 1 wherein said first and second engagement members are both formed of a gas impermeable material, said first engagement member extending substantially over an entire length of said upper rear edge of said main body portion, said second engagement member extending substantially over an entire length of said free end edge of said lid member, and said slit being a bottomed slit.

3. A grass collection bag as claimed in claim 2 wherein said main body portion and said lid member are both formed of a gas permeable material.

4. A grass collection bag as claimed in claim 3 wherein said first engagement member defines said bottomed slit and said second engagement member defines said projection.

5. A grass collection bag as claimed in claim 4 wherein said first engagement member is oscillatably supported by a rod-like frame mounted adjcent said upper rear edge of said main body portion.

* * * * *